United States Patent [19]

Takano

[11] Patent Number: 4,951,728

[45] Date of Patent: Aug. 28, 1990

[54] LOUVER DEVICE FORMED BY SHEET-LIKE MATERIAL

[76] Inventor: Kouichi Takano, 737-17 Miyashita, Yugawara-Machi, Ashigara-Shimo-Gun, Kanagawa-Ken, Japan, 259-03

[21] Appl. No.: 397,361

[22] Filed: Aug. 21, 1989

Related U.S. Application Data

[63] Continuation of Ser. No. 134,834, Dec. 18, 1987, abandoned.

[51] Int. Cl.⁵ .............................................. E06B 9/26
[52] U.S. Cl. .............................. 160/166.1; 160/104; 98/40.24
[58] Field of Search ............... 160/166.1, 104, 131, 160/332; 98/121.2, 40.24, 40.28

[56] References Cited

U.S. PATENT DOCUMENTS

| | | | |
|---|---|---|---|
| 2,513,056 | 6/1950 | Scallon | 160/104 X |
| 3,232,205 | 2/1966 | Bamstead | 160/104 X |
| 4,454,904 | 6/1984 | Oxman | 160/332 |

Primary Examiner—Blair M. Johnson
Attorney, Agent, or Firm—Frishauf, Holtz, Goodman & Woodward

[57] ABSTRACT

A louver device comprises a main body formed of a flexible sheet-like material. A large number of slits are formed in the main body such that the portions between the adjacent slits constitute slats. The louver device also comprises holding/deforming means for shearing at least part of the main body in the direction of the surfaces of the main body. The shearing force applied to the main body serves to twist the end of the slats, thereby slanting the slats.

16 Claims, 7 Drawing Sheets

LOUVER DEVICE FORMED BY SHEET-LIKE MATERIAL

This application is a continuation of application Ser. No. 07/134,834, filed Dec. 18, 1987 now abandoned.

BACKGROUND OF THE INVENTION

1. Field of the Invention

The present invention relates to a louver device made of a flexible sheet-like material and, more particularly, to a louver device wherein a plurality of slits are formed in a main body such that a slat is defined between the adjacent slits and wherein the slats are slanted by shearing the main body in the direction of the surfaces thereof.

2. Prior Art

Conventionally, a so-called Venetian blind has been well known as a louver device used for adjusting the amount of light passing through a window or the like. However, a conventional louver device of this type has a complicated structure and the manufacturing cost thereof is high. In addition, it hangs down whenever it is used. Therefore, the conventional louver device of this type does not have a wide range of application; it cannot be used for a skylight, for example.

Another type of louver device has been well known wherein a plurality of slats are rotatably supported at both ends and are slanted simultaneously by means of a link mechanism or the like. A louver device of this type can be used for a skylight. However, it is also complicated in structure and the manufacturing cost thereof is high. In addition, it is inevitably large and heavy.

A louver device adapted to control the light amount can be used not only in a house for dwelling but other kinds of houses. For example, it can be used for a greenhouse, so as to control the amount of light entering the greenhouse. If a greenhouse has a louver device on the inner side of the roof and the inner side of the wall, both the amount of sunlight entering the greenhouse and the amount of infrared rays radiating from the interior of the greenhouse can be controlled. As a result, the temperature in the greenhouse can be controlled easily without requiring a large amount of energy. Further, the plants in the greenhouse can be grown easily. However, if the inner side of the roof is completely covered with a louver device, the area for installation will be very wide, requiring a very high cost for the louver device itself. In addition, the greenhouse must have a structure sufficient to withstand the weight of the louver device, with the result that a very high cost will be required for the greenhouse, too. For these reasons, it is required that a louver device intended for use in a greenhouse have a simple structure and be light in weight. It is also required that the manufacturing cost thereof be low.

SUMMARY OF THE INVENTION

The present invention has been developed in consideration of the above circumstances, and the object of the invention is to provide a louver device which is simple in structure and can, therefore, be made at a low cost, and which is light in weight.

To achieve this object, the invention provides a louver device, comprising a main body which is made of a flexible sheet-like material and in which a large number substantially parallel slits are cut such that the portions between the adjacent slits serve as slats. By shearing the main body in the direction of the surfaces thereof, each slat is twisted at both ends, with the result that it is slanted. By adjusting the shearing strain of the main body, the slats can be slanted at an arbitrary angle within a predetermined range, so that the amount of light passing through the louver device can be controlled at an arbitrary value.

A louver device of this type can be formed very easily; it only requires a main body which is made of a sheet-like material having a plurality of slits, and a frame which supports the main body and adapted to shear the main body. Therefore, the louver device is very simple in structure and can be manufactured at a very low cost. Furthermore, the louver device is light in weight and is very thin.

With respect to the present invention, various types of louver devices can be considered. The possible louver devices can be classified roughly into the two types mentioned below.

The first type of louver devices comprises a main body which is formed of a sheet-like material and in which a large number of slits are cut from the vicinity of one side of the main body to the vicinity of the opposite side thereof. The both side portions of the main body are attached to frame members. The entire main body is sheared by rotating the frame members or by displacing them in opposite directions along the side portions of the main body. For example, the main body is sheared such that the plane shape thereof becomes a parallelogram. By deforming the main body in this manner, the slat defined between the adjacent slits is twisted at both ends, so that it is slanted.

The second type of louver device comprises a main body such as that mentioned above. In the second type, however, each of the slats has a pair of legs at each ends. The respective ends of the legs are attached to different frame members. The frame members are displaced in opposite directions along the side portions of the main body, thereby shearing only the paired legs. In comparison with the first type, the second type is somewhat complicated in structure, but it is advantageous in that the plane shape of the main body is not substantially changed even when the slats are slanted.

BRIEF DESCRIPTION OF THE DRAWINGS

The present invention can be more fully understood from the following detailed description taken in conjunction with the accompanying drawings, in which.

DETAILED DESCRIPTION OF THE PREFERRED EMBODIMENTS

Figure 1:
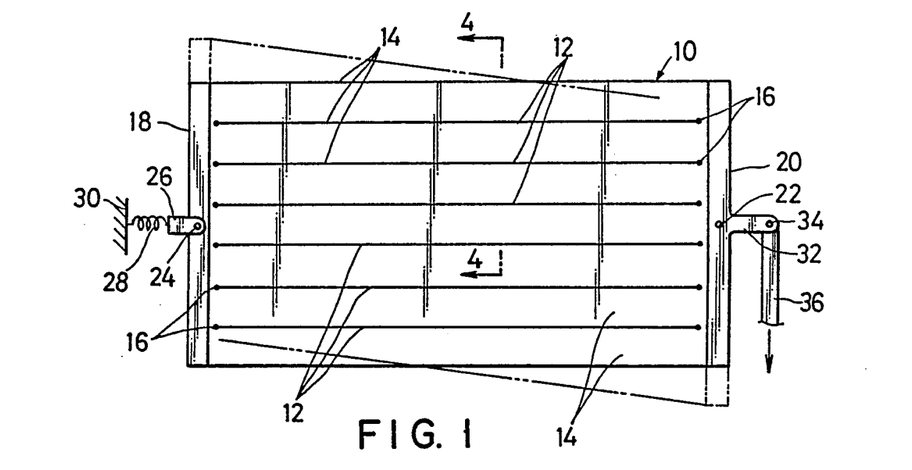
FIG. 1 is a plan view illustrating the louver device according to the first embodiment of the present invention.

The embodiments of the present invention will now be described, with reference to the accompanying drawings. FIGS. 1 through 5 illustrate the first embodiment of the present invention. FIG. 1 is a plan view, in which reference numeral 10 denotes the main body of the louver device. This main body is formed of a flexible sheet-like material. The sheet-like material is of a laminated structure, in which thin sheets of various kinds (e.g., a synthetic resin film, a thin metal plate, cloth, paper, or the like) are stacked one upon another. The sheet-like material is preferably formed by use of an aluminum-deposited synthetic resin film, both surfaces of which are polished to provide a light-reflecting surface (the surfaces are specularly polished, for example).

A plurality of slits 12 are cut in main body 10 such that they extend between the vicinity of one side and the vicinity of the opposite side. Slits 12 are straight and are substantially parallel to one another. A stop hole is formed at the ends of each slit, so as to prevent the side portions of the sheet-like material from being torn. The portion of main body 10 which is located between the adjacent slits serves as slat 14.

Frame members 18 and 20 are attached to the side portions of main body 10. The frame members are coupled to main body 10 by means of an adhesive, for example. The central portion of one (20) of the frame members is rotatably attached to a support member by means of pin 22. Arm 32 extends from the central portion of frame member 20, and the extended end of arm 32 is rotatably connected to rod 36 by means of pin 34. Rod 36 can be pushed or pulled by a driving mechanism (not shown).

Pull member 26 is rotatably attached to the central portion of the other frame member (18) by means of pin 24. Pull member 26 is supported by stationary construction 30 by use of a tensile force generator, e.g., spring 28. Therefore, main body 10 of the louver device is applied with a certain tensile force by spring 28, so that it can be kept stretched at a predetermined location while maintaining a flat condition.

Figure 2:
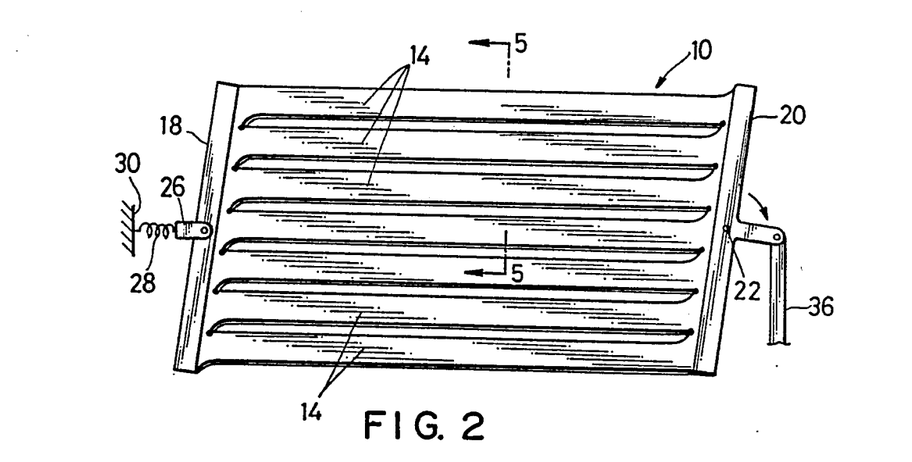
FIG. 2 is a plan view illustrating the louver device, the slats of which have been slanted.
Figure 3:
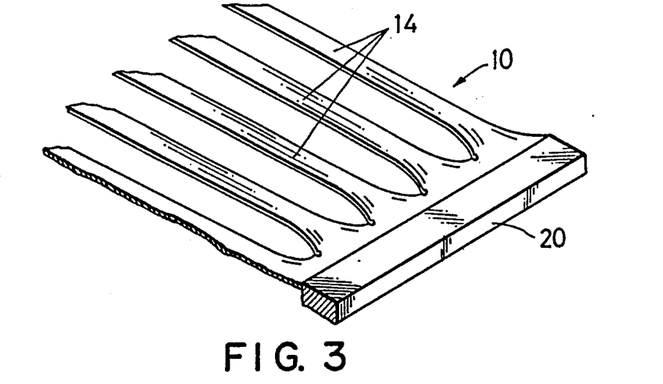
FIG. 3 is a perspective view of part of the louver device shown in FIG. 2.
Figure 4:
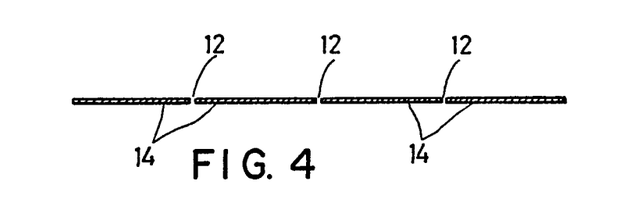
FIG. 4 is a sectional view taken along line 4—4 in FIG. 1.
Figure 5:
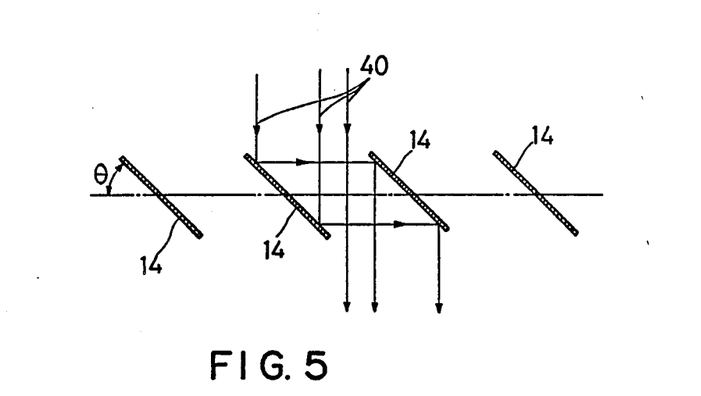
FIG. 5 is a sectional view taken along line 5—5 in FIG. 2.

If main body 10 of the louver device is not applied with a shearing force, as shown in FIG. 1, slats 18 are located within the same plane, as shown in FIG. 4. This condition is the closed state of the louver device. When rod 36 is pulled, as shown in FIG. 2, frame members 18 and 20 are rotated, so that main body 10 stretched between frame members 18 and 20 is sheared in the direction of the surfaces of main body 10. For example, main body 10 is deformed such that its plane shape is changed from a rectangular shape to a parallelogram. Generally, a sheet-like material and a plate member are sufficiently rigid against such deformation. In the louver device of the present invention, however, a large number of slits are formed in main body 10 (sheet-like material) such that main body 10 is divided into a large number of slats 14. With this construction, the ends of each slat 14 are twisted as a result of the shearing strain of main body 10. In other words, the shearing force applied to main body 10 serves to twist the ends of each slat 14. As a result of the twist at the ends of each slat 14, each slat 14 is slanted, as shown in FIG. 2 or 5. This condition is an open state of the louver device. Angle $\theta$ at which slats 14 are slanted can be adjusted by controlling the shearing deformation applied to main body 10, i.e., the angle of rotation of frame members 18 and 20.

It is impossible to know in which direction the ends of each slat 14 will be twisted in response to a shearing force applied to main body 10. In order to permit slats 14 to be slanted in the same direction, therefore, it is necessary to control the direction of the twist at the ends of each slat 14. This control can be easily carried out by permanently deforming the ends of slats 14 in the same direction beforehand. This permanent deformation need not be large; it may be very small. For example, when manufacturing the main body of the louver device, the main body is applied with a large shearing force while simultaneously controlling slats 14, by use of an appropriate jig, such that all slats 14 are slanted in the same direction. The permanent deformation applied to the ends of each slat by this treatment is sufficient in practical use.

In this type of louver device, angle $\theta$ at which slats 14 are slanted cannot be determined to be very large, as can be understood from the operating principles of the louver device. The maximal angle depends on the physical properties of the sheet-like material of main body 10, but it is generally 70° or thereabouts. Therefore, if light falls on the louver device perpendicularly to the surface thereof, the louver device cannot permit all amount of the light to pass therethrough. However, this problems can be overcome by permitting both surfaces of the sheet-like material to serve as a light-reflecting surface, preferably as a specular surface. In the case where slats 14 are slanted at an angle of 45°, as shown in FIG. 5, a part of light 40 falling on the louver device perpendicularly to the surface thereof will pass between the adjacent slats. The rest of light 40 will be reflected by the upper surface of one slat, so that it will be guided to the lower surface of the adjacent slat, by which it will be reflected again in the same direction as it falls on the louver device. As a result, all amount of light 40 is permitted to pass through the louver device, except for a certain amount which may be lost due to the reflection efficiency. The general relationship between the angle of incidence of light and the angle at which the slats are slanted is that, if the angle at which the slats are slanted is half the angle of incidence of light, all amount of light is permitted to pass through the louver device.

In the above embodiment, the main body of the louver device is sheared by rotating frame members 18 and 20. However, the main body may be sheared by displacing frame members 18 and 20 in the opposite directions along the side portions of main body 10, as indicated by the two-dot-dash lines in FIG. 1. The displacement of frame members 18 and 20 can be easily attained if only a known guide mechanism is used.

Figure 6:
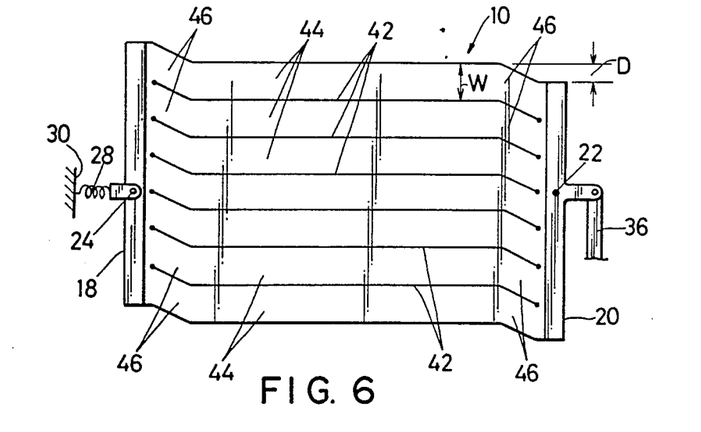
FIG. 6 is a plan view illustrating the louver device according to the second embodiment.

FIG. 6 illustrates the louver device according to the second embodiment of the present invention. In this louver device, slits 42 are cut such that their ends are bent in the opposite directions. As a result, the ends portions of each slat 44 constitute bent portions 46. It is preferable that distance D by which bent portions 46 are protruded from the main portion of slat 44 be about one half of width W of the main portion of slat 44. By provision of bent portions 46, part of the twist at the ends of each slat 44 is converted into a bending deformation, with the result that the stress at the ends of each slat 44 can be reduced. The present inventor has not yet analyzed this phenomenon in view of the strength of materials, but already confined the occurrence of the phenomenon. In the louver device of the second embodiment, the slats can be slanted at an angle as large as 90°.

Figure 7:
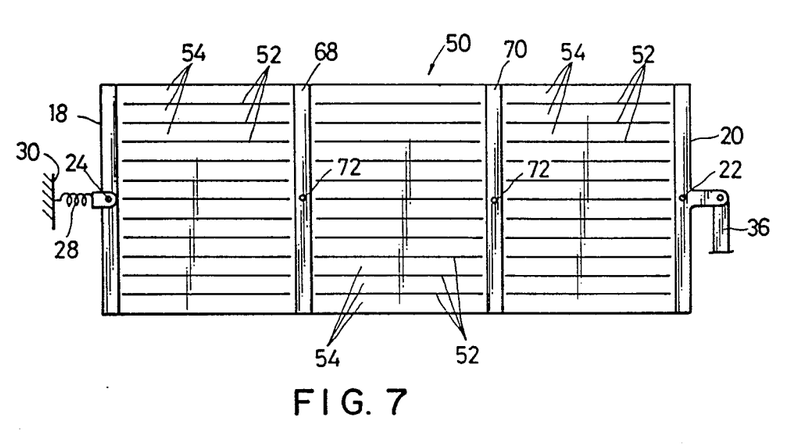
FIG. 7 is a plan view illustrating the louver device according to the third embodiment.

FIG. 7 illustrates the louver device according to the third embodiment. In this louver device, main body 50 is formed by a long strip of sheet-like material, and auxiliary frame members 68 and 70 are provided at intermediate locations of main body 50. Slits 52 and slats 54 are formed, as in the first or second embodiment, between the auxiliary frame member and the adjacent main or auxiliary frame member. Auxiliary frame members 68 and 70 are rotatably supported by the frame of a greenhouse, by use of pin 72, for example. In the louver device of the third embodiment, main body 50 is supported at its intermediate locations as well. In the case where a large louver device is required, as in a greenhouse, the use of the third embodiment is particularly advantageous. The operation of the third embodiment is the same as that of the first embodiment.

Figure 8:
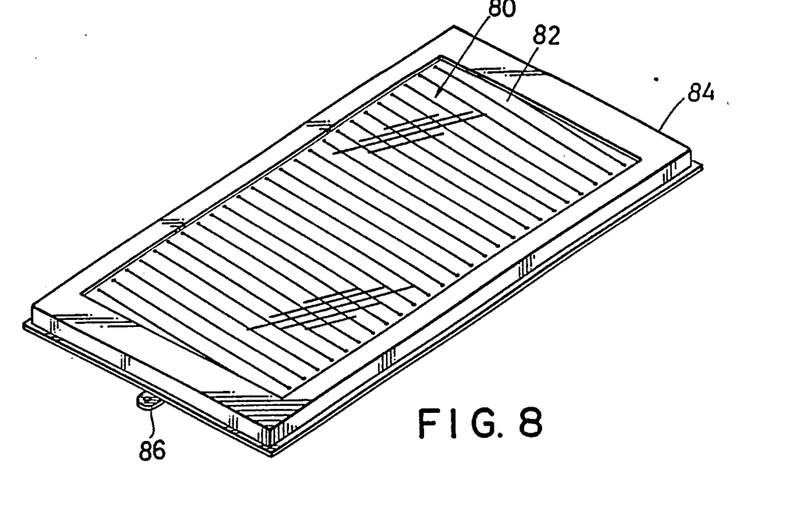
FIG. 8 is a perspective view illustrating the louver device according to the fourth embodiment.

FIG. 8 illustrates the louver device according to the fourth embodiment. This louver device is fitted in a window. In FIG. 8, reference numeral 84 denotes a window frame, and louver device 80 of the fourth embodiment is located between two glass plates 82 attached to window frame 84. Louver device 80 is preferably of a type wherein the frame members are displaced in the opposite directions along the side portions of the main body, as in the case of the second embodiment. According to the fourth embodiment, louver device 80 is operated externally of the window, by means of lever 86.

Figure 9:
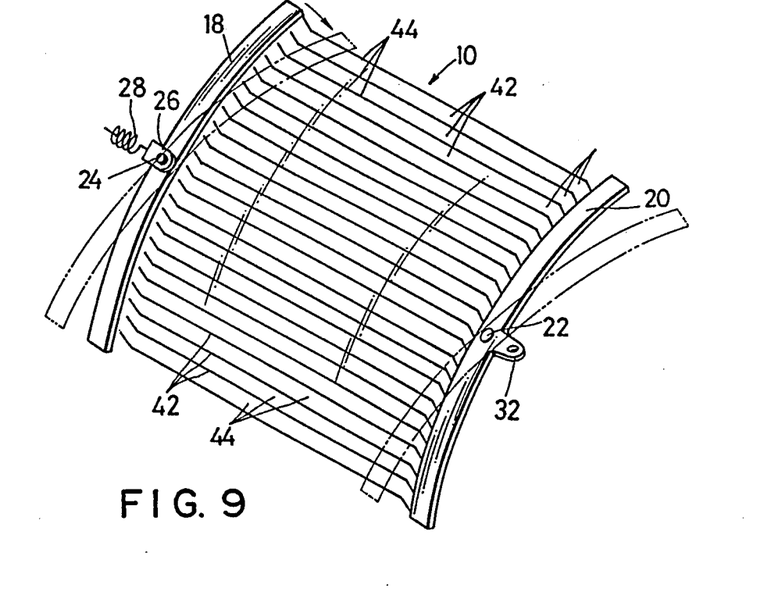
FIG. 9 is a perspective view illustrating the louver device according to the fifth embodiment.

FIG. 9 illustrates the louver device according to the fifth embodiment. The louver device of this embodiment is substantially similar to that of the second embodiment, except that frame members 18 and 20 are curved. Therefore, the fifth embodiment provides a curved louver device.

Figure 10:
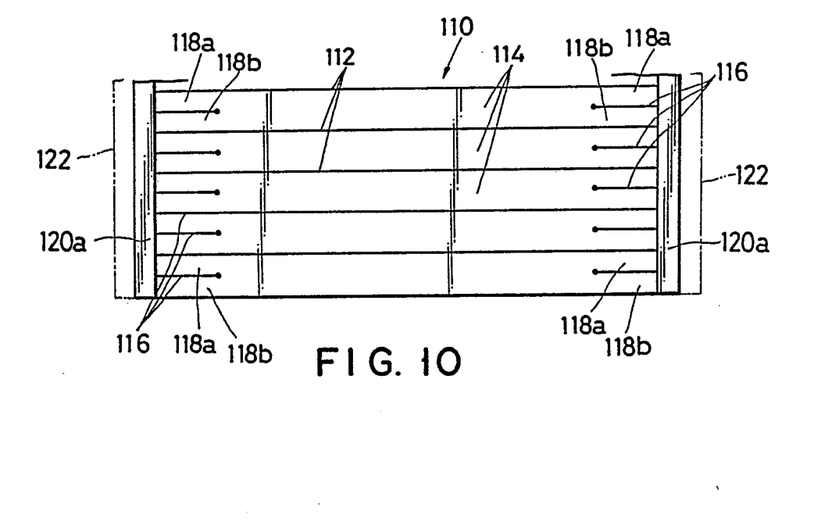
FIG. 10 is a plan view illustrating the louver device according to the sixth embodiment.
Figure 11:
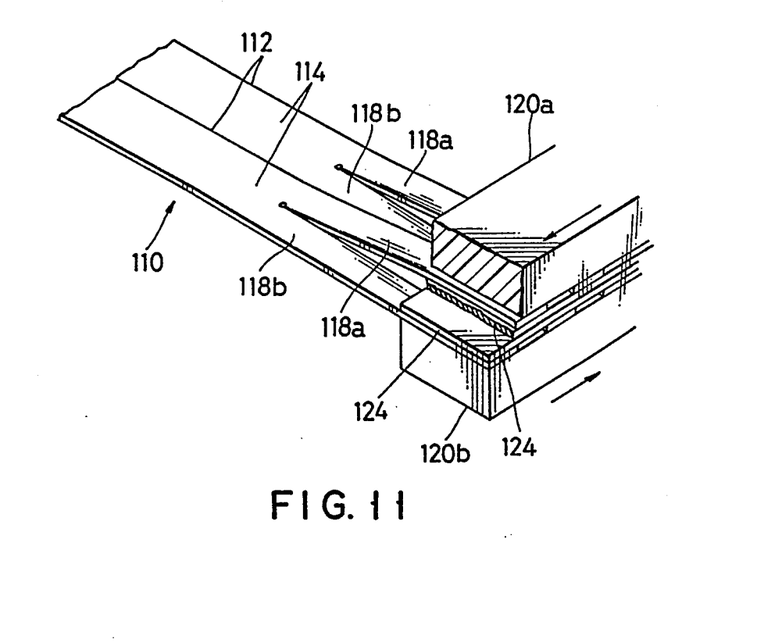
FIG. 11 is a partially-enlarged perspective view of part of the louver device shown in FIG. 10.
Figure 12:
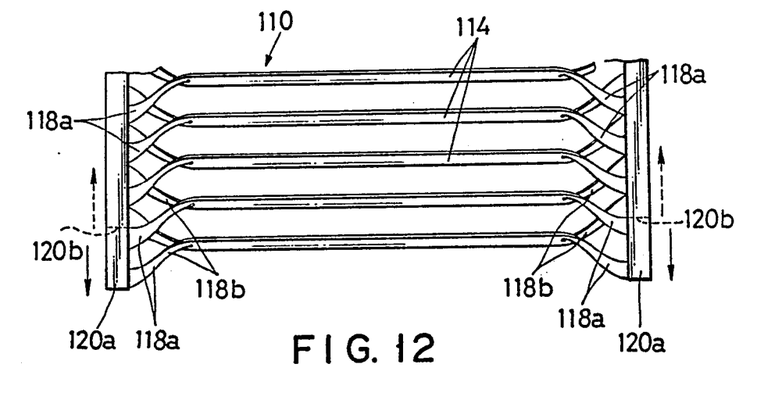
FIG. 12 is a plan view illustrating the condition wherein the slats of the louver device shown in FIG. 10 have been slanted.

FIGS. 10 through 12 illustrate the louver device according to the sixth embodiment of the present invention. The louver devices which will be described hereinafter correspond to the second type mentioned in the section of "Summary of the Invention". In FIGS. 10-12, reference numeral 110 denotes the main body of the louver device. A plurality of parallel slits 112 are cut in main body 110 such that the portion between the adjacent slits serves as slat 114. At the end portions of each slat 114, auxiliary slit 116, which is parallel to slits 112, is cut such that the end portions constitute legs 118a and 118b. A pair of frame members 120a and 120b are attached to each side portion of main body 110. The tip end of one (118a) of the legs is connected to frame member 120a, while the tip end of the other leg (118b) is connected to frame member 120b. Reference numeral 124 in FIG. 11 denotes a slide member. When frame members 120a and 120b are moved in the opposite directions, slide member 124 prevents the tip ends of the legs from abutting each other, thereby ensuring smooth movement of frame members 120a and 120b.

When manufacturing the louver device of the sixth embodiment, slits 112 and auxiliary slits 116 are cut such that they do not extend into marginal regions 122 of main body 110, as is shown in FIG. 10, so as to prevent main body 110 from being divided into pieces. After the tip end portions of the legs are adhered to the frame members, marginal regions 122 are cut off.

According to the sixth embodiment, frame members 120a and 120b are attached to a fixed frame or the like by means of a spring, for example, thereby stretching main body 110 in a substantially flat condition. As long as frame members 120a and 120b are not displaced relative to each other, slats 114 are kept in the same plane (i.e., closed state), as shown in FIGS. 10 and 11. When frame members 120a and 120b are displaced in the opposite directions along the side portions of main body 110, as indicated by the arrows in FIG. 11, only legs 118a and 118b are sheared, thereby twisting legs 118a and 118b. As a result, slats 114 are slanted, as shown in FIG. 12. The louver devices of the second type mentioned in the section of "Summary of the Invention" are somewhat complicated in structure in comparison with the louver devices of the first type, but are advantageous in that the plane shape of the main bodies does not change even when the slats are slanted.

Figure 13:
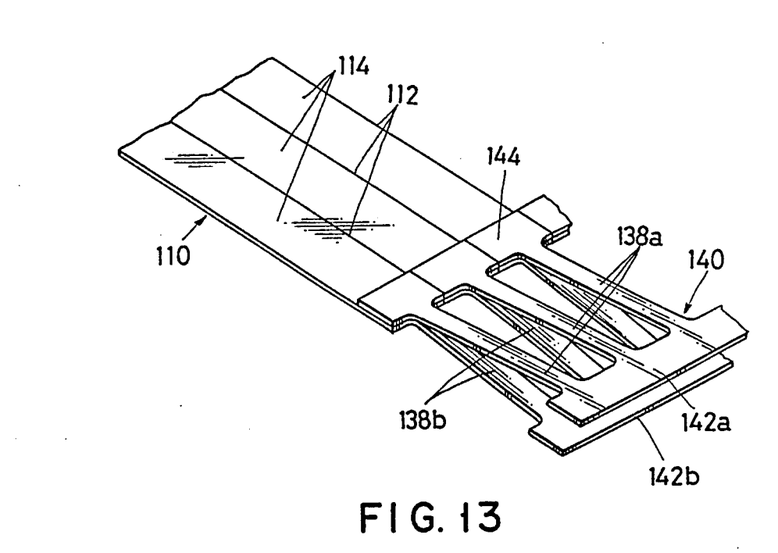
FIG. 13 is a perspective view illustrating part of the louver device according to the seventh embodiment.

FIG. 13 illustrates the seventh embodiment of the present invention. According to this embodiment, a strip of auxiliary sheet-like member 140 is stacked on each side portion of sheet-like main body 110, and side portion 144 of auxiliary sheet-like member 140 is adhered to main body 110. In this condition, slits 112 are cut and that portion of main body 110 which is overlaid by auxiliary sheet-like member 140 is partially stamped out. As a result, a pair of legs 138a and 138b and leg-connecting portions 142a and 142b are formed. Connecting portions 142a and 142b are adhered to the respective frame members, such as those mentioned above. In comparison with the sixth embodiment, the seventh embodiment is advantageously easy to manufacture.

Figure 14:
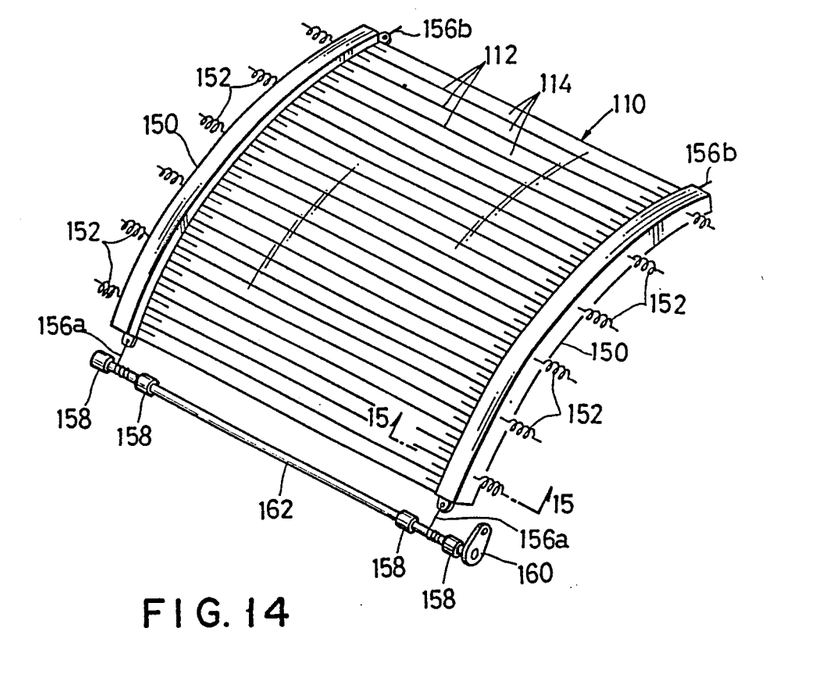
FIG. 14 is a perspective view illustrating the louver device according to the eighth embodiment.
Figure 15:
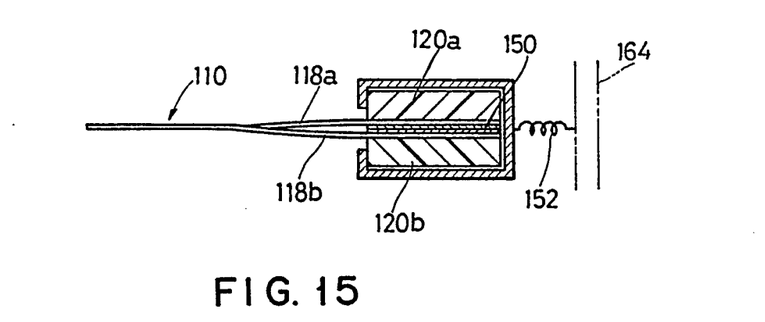
FIG. 15 is a sectional view taken along line 15—15 in FIG. 4.

FIGS. 14 and 15 illustrate the eighth embodiment of the present invention. As illustrated, the louver device of the eighth embodiment is curved, and comprises main body 110 and frame members 120a and 120b, such as those employed in the embodiment shown in FIGS. 10 through 12. In the eighth embodiment, frame members 120a and 120b have a certain degree of elasticity, and can be kept curved. Frame members 120a and 120b are slidably received in guide frame member 150, which is curved and has a substantially C-shaped cross section. Guide frame member 150 is attached to a fixed frame by means of springs 152, for example. Using the tensile force of springs 152, main body 110 is stretched in a curved condition. The end of one (120b) of the frame members is connected to the fixed frame by means of wire 156b. The end of the other frame (120a) is connected to wire 156a, which is wound around shaft 162. Shaft 162 is rotatably supported by bearings 158, and lever 162 is attached to one end of shaft 162.

According to the eighth embodiment, when shaft 162 is rotated by operating lever 162, wire 156a is pulled, permitting frame members 120a and 120b to slide in the opposite directions. As a result, slats 114 are slanted, opening the louver device. The louver device of the eighth embodiment can be fitted in a window frame assembly which uses a curved glass plate.

The present invention is not limited to the above embodiments. In the louver devices of the above embodiments, slats can be slanted freely. However, the present invention can be applied to a louver device wherein the slats are kept open at a certain angle. Furthermore, the present invention is not limited to a louver device used for controlling the amount of light passing therethrough. It can be applied to a louver device used for controlling the amount of fluid passing therethrough. It is evident that the present invention can be modified in various manners without departing from the spirit and scope of the invention.

What is claimed is:

1. A louver device which uses a sheet-like material, comprising:
    a main body formed of a flexible and deformable sheet-like material, said sheet-like main body having opposite main surfaces and opposing end portions, said sheet-like main body having a plurality of slits therein, said slits being parallel to a given line and extending from the vicinity of each of said end portions toward the other of said end portions, with said slits having their respective ends bent in opposite angles from being parallel to said given line, the portions of said sheet-like main body which are located between said slits serving as respective slats; and
    holding and deforming means coupled to said sheet-like main body for supporting and holding said sheet-like main body in a predetermined shape, and including a support means and shearing means for shearing at least part of said sheet-like main body substantially in the direction of the plane of said opposite main surfaces of said sheet-like main body, said shearing means including: (1) respective frame members attached to each of said end portions of said sheet-like main body, and (2) means for moving at least one of said frame members relative to said support means for shearing and deforming said sheet-like main body to cause substantially all of said slats of said sheet-like main body to deform and to tilt or rotate relative to said end portions of said sheet-like main body and with respect to the direction of said plane of said opposite main surfaces of said sheet-like main body due to said movement of said frame members.

2. A louver device which uses a sheet-like material, comprising:
    a main body formed of a flexible and deformable sheet-like material, said sheet-like main body having opposite main surfaces and opposing end portions, said sheet-like main body having a plurality of slits therein, said slits extending from the vicinity of each of said end portions toward the other of said end portions, the portions of said sheet-like main body which are located between said slits serving as respective slats;
    holding and deforming means coupled to said sheet-like main body for supporting and holding said sheet-like main body in a predetermined shape, and including a support means and shearing means for shearing at least part of said sheet-like main body substantially in the direction of the plane of said opposite main surfaces of said sheet-like main body, said shearing means including: (1) respective frame members attached to each of said end portions of said sheet-like main body, and (2) means for moving at least one of said frame members relative to said support means for shearing and deforming said sheet-like main body to cause substantially all of said slats of said sheet-like main body to deform and to tilt or rotate relative to said end portions of said sheet-like main body and with respect to the direction of said plane of said opposite main surfaces of said sheet-like main body due to said movement of said frame members; and
    wherein said frame members are curved, and said sheet-like main body has a curved shape.

3. The louver device of claim 2, wherein said curved shape of said sheet-like main body corresponds to the curve of said frame members.

4. A louver device which uses a sheet-like material, comprising:
    a main body formed of a flexible and deformable sheet-like material, said sheet-like main body having opposite main surfaces and opposing end portions, said sheet-like main body having a plurality of slits therein, said slits extending from the vicinity of each of said end portions toward the other of said end portions, the portions of said sheet-like main body which are located between said slits serving as respective slats;
    holding and deforming means coupled to said sheet-like main body for supporting and holding said sheet-like main body in a predetermined shape, and including a support means and shearing means for shearing at least part of said sheet-like main body substantially in the direction of the plane of said opposite main surfaces of said sheet-like main body, said shearing means including: (1) respective frame members attached to each of said end portions of said sheet-like main body, and (2) means for moving at least one of said frame members relative to said support means for shearing and deforming said sheet-like main body to cause substantially all of said slats of said sheet-like main body to deform and to tilt or rotate relative to said end portions of said sheet-like main body and with respect to the direction of said plane of said opposite main surfaces of said sheet-like main body due to said movement of said frame members;
    said sheet-like main body comprises an elongated flexible sheet of material; and
    said holding and deforming means comprises at least one auxiliary frame member attached to an intermediate portion of said sheet-like main body between said opposing end portions thereof, said slits and said slats being formed between said at least one auxiliary frame member and each of said frame members.

5. The louver device of claim 4, wherein said sheet-like main body comprises a long strip of said flexible sheet material.

6. The louver device of claim 1, wherein at least one of said opposite main surfaces of said sheet-like main body is a light-reflecting surface.

7. The louver device of claim 1, wherein said support means is fixed; and wherein said shearing means is rotatable relative to said fixed support means and fixedly connected to said respective end portions of said sheet-like main body for shearing said sheet-like main body when said shearing means is rotated relative to said sheet-like main body and relative to said support means.

8. A louver device which uses a sheet-like material, comprising:
    a main body formed of a flexible and deformable sheet-like material, said sheet-like main body having opposite main surfaces and opposing end portions, said sheet-like main body having a plurality of substantially straight slits therein, said slits extending from the vicinity of each of said end portions toward the other of said end portions, the portions of said sheet-like main body which are located between said slits serving as respective slats; and holding and deforming means coupled to said sheet-like main body for supporting and holding said sheet-like main body in a predetermined shape, and including shearing means for shearing at least part of said sheet-like main body with respect to the direction of the plane of said opposite surfaces of said sheet-like main body;

each of said slats between said slits including first and second legs at the ends thereof which are at said end portions of said sheet-like main body, said shearing means further including first and second frame members arranged along each end portion of said sheet-like main body, an end portion of said first leg of each slat being attached to said first frame member and an end portion of said second leg of each slat being attached to said second frame member, said first and second frame members being movable in opposite directions with respect to each other along said end portions of said sheet-like main body and substantially in the plane of said sheet-like main body to move said first legs of each slat relative to said respective second legs of each slat and to thereby shear and deform portions of said sheet-like main body and tilt or rotate said slats relative to said plane of said sheet-like main body.

9. The louver device of claim 8, wherein each of said slats has an end portion having an auxiliary slit therein to define said first and second legs.

10. The louver device of claim 9, wherein said auxiliary slits are substantially parallel to said first-mentioned substantially straight slits.

11. The louver device of claim 8, further comprising a strip of auxiliary sheet-like member adhered to each of said end portions of said sheet-like main body, said first legs of each slat being formed in said auxiliary sheet-like members, and said second legs of each slat being formed in said end portions of said sheet-like main body.

12. The louver device of claim 8, wherein the said first and second frame members are curved, and said sheet-like main body has a curved shape.

13. The louver device of claim 12, wherein said curved shape of said sheet-like main body corresponds to the curve of said frame members.

14. The louver device of claim 8, wherein at least one of said opposite main surfaces of said sheet-like main body is a light-reflecting surface.

15. The louver device of claim 8, wherein said first and second legs of each of said slats extends from said sheet-like main body in respective different planes from each other.

16. A louver device which uses a sheet-like material, comprising:

a main body formed of a flexible and deformable sheet-like material, said sheet-like main body having opposite main surfaces and opposing end portions, said sheet-like main body having a plurality of slits therein, said slits being parallel to a given line and extending from the vicinity of each of said end portions toward the other of said end portions, with said slits having their respective ends bent in opposite angles from being parallel to said given line, the portions of said sheet-like main body which are located between said slits serving as respective slats; and holding and deforming means coupled to said sheet-like main body for supporting and holding said sheet-like main body in a predetermined shape, and including a support means and shearing means for shearing at least part of said sheet-like main body substantially in the direction of the plane of said opposite main surfaces of said sheet-like main body, said shearing means including: (1) respective frame members attached to each of said end portions of said sheet-like main body, and (2) means for pivoting at least one of said frame members relative to said support means in the plane of the opposite main surfaces of said sheet-like main body for shearing and deforming said sheet-like main body to cause substantially all of said slats of said sheet-like main body to deform and to tilt or rotate relative to said end portions of said sheet-like main body and with respect to the direction of said plane of said opposite main surfaces of said sheet-like main body due to said movement of said frame members.

* * * * *